United States Patent [19]

Banks

[11] 3,720,276
[45] March 13, 1973

[54] WEIGHING MACHINES
[76] Inventor: Clayton Hatton Banks, Whitham-on-the-Hill, Bourne, England
[22] Filed: March 19, 1971
[21] Appl. No.: 125,953

[30] Foreign Application Priority Data
March 23, 1970 Great Britain.....................13,977/70

[52] U.S. Cl..................................177/122, 53/59 W
[51] Int. Cl. ..............................................G01g 13/02
[58] Field of Search........53/59 W; 177/50, 119, 120, 177/121, 122, 123

[56] References Cited

UNITED STATES PATENTS 3,073,399  1/1963  Durand............................177/122 X
3,416,619  12/1968  McClusky.........................177/123 X Primary Examiner—Travis S. McGehee
Attorney—Synder & Butrum

[57] ABSTRACT

Apparatus for weighing and delivering quantities of potatoes to a delivery point comprises two conveyor belts feeding potatoes to a plurality of weighing devices. One of the conveyors carries small potatoes and the other large potatoes, and openings are formed in the walls of the conveyors, the potatoes being fed through the openings into weighing pans of the weighing devices. Doors are provided over the openings so that the flow of potatoes to the pans may be controlled, and a sensor associated with each weighing device is operable to tip the pan of the weighing device when the weight of potatoes in the pan exceeds a predetermined final weight, the sensor also being operable to direct the tipped potatoes to a reject conveyor or a delivery conveyor depending on the final weight of the potatoes in the pan.

22 Claims, 8 Drawing Figures

3,720,276

Inventor
CLAYTON H. BANKS

Inventor
CLAYTON H. BANKS

WEIGHING MACHINES

BACKGROUND OF THE INVENTION

This invention relates to apparatus for delivering to a delivery point measured quantities of particulate commodities such as potatoes, lumps of coal or ore.

The development of supermarket sale organizations and the general marketing of vegetables such as potatoes demands that accurate measured quantities of such vegetables should be packed in sealed containers such as bags of polythene. Generally speaking, the bags contain potatoes in quantities of substantially all the same weight, for example ten pounds; the tolerance of one or two ounces overweight is permitted but no underweight is acceptable to the authorities.

Known machines for weighing potatoes for packing in polythene bags employing two substantially parallel and inclined conveyor belts, the first belt conveying the large and medium sized potatoes, and the second belt carrying the smaller potatoes. The potatoes are sorted into these two weight ranges by a sorting machine mounted for loading on to the two belts.

The conveyors deliver the potatoes to the bags which are supported on a weighing apparatus; the larger potatoes are used to bring the bag up to almost the required weight, the delivery of the large potatoes is then cut off and the smaller potatoes from the second conveyor are used to top up the bag to just over the predetermined weight. When the requisite weight in the bag has been reached and the slight over-weight has been delivered the weighing machine delivers the potatoes to a bagging machine which seals the potatoes inside the bag.

In another known method of weighing and packing such potatoes a single conveyor is used to carry the larger size potatoes to the bags and the topping up to the slight overweight is effected by an operator, who adds the smaller potatoes by hand. The hand operated topping up is slow and uneconomic since many hundreds of bags may be required daily; the two conveyor machines at present in use have the disadvantage that the smaller potatoes added to the bag often bring the weight of the bag to an overweight which is uneconomic and this can be exceedingly costly in the long run.

It is a main object of the present invention to minimize or eliminate these disadvantages by providing apparatus for automatically delivering particulate commodities such as potatoes to a delivery point in measured quantities at a higher rate, with an allowable tolerance of overweight.

SUMMARY

Apparatus for delivering measured quantities of particulate commodities to a delivery point, comprises at least one weighing device, a particle receptacle associated with the weighing device, a conveying device operable to convey particles separately in two weight ranges from a loading point to said receptacle, sensing means associated with the weighing device, valve means for controlling the supply of particles of both weight ranges to the receptacle, said sensing means being operable at a predetermined preliminary weight in the receptacle to actuate said valve means to terminate delivery of particles in the higher weight range to the receptacle and at a predetermined final weight in the receptacle to actuate said valve means to terminate delivery of particles in the lower weight range to the receptacle, discharge means for discharging at least some particles in the receptacle when said final weight is reached, and directing means actuated by said sensing means for directing particles on discharge from the receptacle, whereby if, when delivery of particles is terminated, the weight of said particles in the receptacle is within a predetermined allowable tolerance over the final weight all the particles in the receptacle are discharged and directed to the delivery point, and if the weight of said particles in the receptacle is above the predetermined allowable tolerance over the final weight at least some of said particles in the receptacle are discharged and directed to a reject point.

Preferably a plurality of weighing devices are provided, each of which include particle receptacles which are supplied with particles by the conveying device. In one embodiment of the invention, if the weight of the particles in the receptacle is above the predetermined allowable tolerance over the final weight, all the particles in the receptacle are discharged and directed to a reject point. In another preferred embodiment of the invention, if the weight of the particles in the receptacle is above the predetermined allowable tolerance over the final weight, only some of the particles are discharged and directed to a reject point. Preferably the particles are potatoes.

DESCRIPTION OF THE PREFERRED EMBODIMENTS

Figure 1:
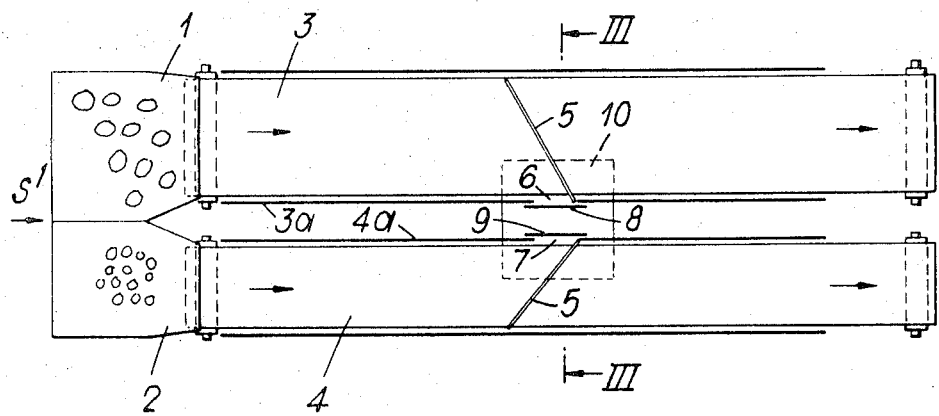
FIG. 1 is a diagrammatic plan view of a conveyor device for delivering potatoes to a weighing device.

The machine shown in the drawings includes a weight sorting device and a weighing apparatus from which a load of potatoes having a weight within a preset required tolerance is fed to a bagging machine. The weighing apparatus as will be described senses an overload beyond the amount tolerance and is either constructed to reject that load or to eject sufficient potatoes to take the weight in the weighing machine receptacle below the required amount so that the final topping up can be completed automatically and the right quantity delivered for bagging.

Referring to the drawings, FIG. 1 shows a sorting device generally indicated at S' of conventional construction delivering larger potatoes through hopper 1 and smaller potatoes through hopper 2.

Each hopper delivers its potatoes to a conveyor belt moving in a direction shown by the arrows in FIG. 1, the hopper 1 to belt 3 and the hopper 2 to belt 4. The conveyors 3 and 4 are provided with side walls 3a and 4a respectively, and each conveyor has a transverse guide bar 5 fixed just above the top surface of the belt, at an angle to the belt. The guide bars deflect potatoes on the travelling belt towards openings 6 and 7 formed in the side walls 3a and 4a respectively; these openings are opened and closed by sliding doors 8 and 9. The doors are operated by pneumatic piston and cylinder assemblies (not shown) which will be described hereinafter. When the doors are open, the potatoes fall between the conveyors into the pan of a weighing device 10, also to be described.

The hoppers 1 and 2 deliver a steady supply of potatoes onto the belts, and if the doors are closed, or if there is an overspill of potatoes at the doors, the excess potatoes which do not pass through the openings move over the guide bars 5 and pass to the end of the conveyors 3 and 4. These excess potatoes are then delivered by suitable means (for example another conveyor belt) back to the sorting device.

Figure 2:
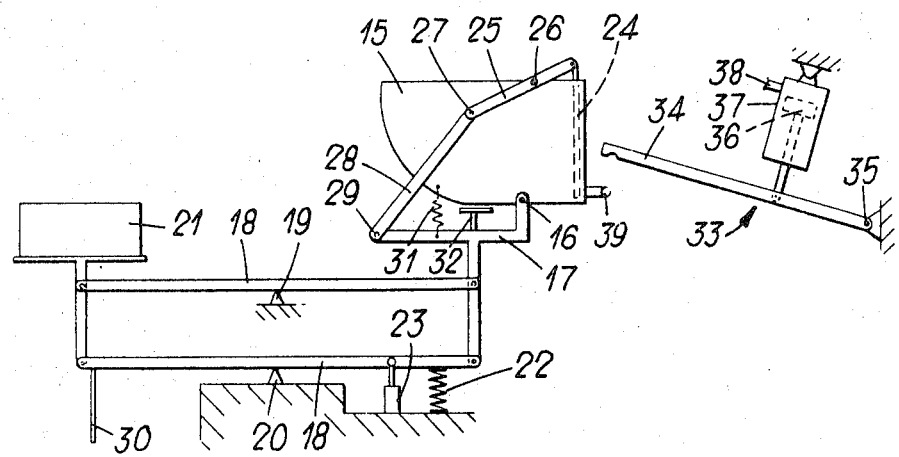
FIG. 2 is a diagrammatic side elevation of the weighing device.

The weighing apparatus 10 is shown in detail in FIG. 2 and comprises a weighing pan 15 pivotally mounted at 16 to a chassis 17. The chassis 17 forms part of a conventional parallelogram weighing scales 18 which balances about knife edges 19 and 20. A counterbalance 21 is provided at the end of the scales remote from the pan, and this counterbalance 21 places the apparatus substantially in balance when a predetermined weight of potatoes is deposited in the pan.

A compression spring 22 and a damper 23 ensure that the reaction of the scales to a correct weight or an overweight is gradual; this allows a sensor 30 attached to the end of the scales to operate, as will be described.

The pan itself is tippable about the pivot 16 and is provided with a door 24 operated by a link 25 pivotally attached to the pan at 26; the link is connected via a floating pivot 27 to a second link 28 which is in turn pivotally attached to the chassis 17 at 29. When the pan is tipped, the links operate to open the door 24 automatically.

The pan 15 is urged downwardly on the chassis by a tension spring 31, but is normally retained in a horizontal position by a stop 32 mounted on the chassis.

A tipping device, generally indicated at 33, comprises an arm 34 pivotally mounted at 35 to a fixed support. Attached to the arm 34 is a piston 36 which slides under air pressure in a cylinder 37. The cylinder is mounted on a fixed support and is provided with an air inlet 38.

The arm 34 is not fixed to the pan 15 but is engageable with an abutment 39 fixed to the pan. The arm is normally retained in the position shown in FIG. 2 where it does not interfere with the balance of the scales, and when tipping of the pan is required, the piston 36 is moved downwardly in the cylinder by air pressure. The arm 34 strikes the abutment 39 and further downward movement of the piston tips the pan.

After tipping, the pan 15 is returned to its position shown in FIG. 2 by the spring 31. During the tipping operation the scales 18 are locked in position on the fulcrum by a piston and cylinder assembly (not shown).

Instead of the pneumatic piston and cylinder assembly 36 and 37, the arm 34 may be moved downwardly by any suitable means such as a hydraulic assembly, or an electrically operated solenoid.

The weighing apparatus is disposed directly beneath the conveyors 3 and 4 and is arranged so that potatoes falling through openings 6 and 7 drop directly into the pan 15. The sensor 30 fixed to the scales 18 serves to indicate whether the pan is an underweight, a correct weight, or an overweight condition. The operation of the sensing means will be described hereinafter.

Figure 3:
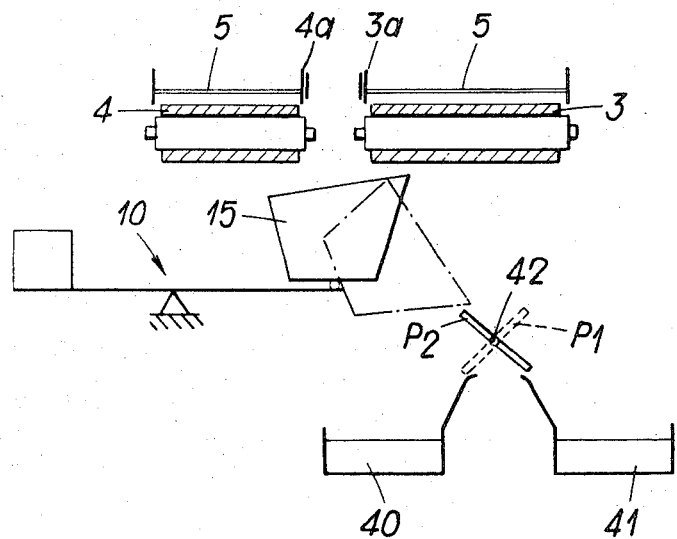
FIG. 3 is a diagrammatic cross-sectional view of the conveyor device shown in FIG. 1 taken along the lines III—III looking in the direction of the arrows and showing beneath the conveyor device the weighing device shown in FIG. 2.

Referring now to FIG. 3, it will be seen that two further conveyors 40 and 41 are disposed beneath the weighing apparatus 10 and the two conveyors 3 and 4. Either of these conveyors 40 and 41 can receive a load of potatoes from the pan 15 when the pan is tipped, the destination of each particular load of potatoes being determined by a rotary gate 42 controlled by a piston and cylinder assembly (not shown) which acts in response to the sensor 30 and which rotates the gate to deflect potatoes from each particular load on to either one of the conveyors 40 and 41.

The conveyor 40 transfers the loads of potatoes dumped on to it to a bagging machine, and the conveyor 41 transfers its loads back to the sorting machine S' shown in FIG. 1 for recirculating through the delivery machine. The conveyor 41 may also be used to deliver excess potatoes from the conveyors 3 and 4 which do not pass through the openings 7 and 8 in the side walls.

The operation of the machine is as follows. With no potatoes in the pan of the weighing device 10, the sensor 30 indicates an underweight condition and operates control means which slide open the door 8 on conveyor 3. Large potatoes are guided through the opening 6 by the guide bar 5 and these potatoes fall into the pan 15. When the weight in the pan reaches a predetermined level approaching the correct weight, the sensor 30 signals to close the door 8 and open the door 9. This allows small potatoes to drop into the pan and to top up the weight to the correct weight value. The sensor 30 then indicates if the pan is in a correct weight or overweight condition. If the weight of potatoes is within the predetermined overweight limit, the sensor operates the rotary gate which moves into position P1 in FIG. 3. If the load is overweight, i.e. greater than the predetermined overweight limit, the gate adopts position P2 in FIG. 3. The pan is then tipped by the mechanism 33 and the potatoes dumped on to conveyor 40 or conveyor 41. As aforesaid, loads dumped on to conveyor 40 pass to a bagging machine for packing and loads dumped on the conveyor 41 pass back to the sorting machine.

The operating circuits which control the various features of the machine are described with reference to FIGS. 5, 6 and 7; in practice the operations are carried out at high speed and this results in a high rate of supply of measured quantities of potatoes with an acceptable overweight tolerance.

Figure 4:
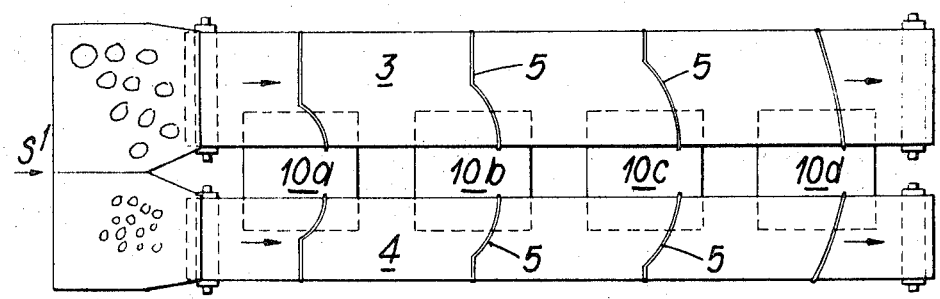
FIG. 4 is a diagrammatic view similar to FIG. 1 showing a multi-loading machine using four weighing devices served by the same conveyor device.

FIG. 4 shows a multi loading machine which has the single conveyors 3 and 4 of FIG. 1 supplying a succession of four weighing devices 10a, 10b, 10c, and 10d.

The doors and the side walls of the conveyor are omitted for clarity, and the guide bars 5 are formed, as shown, to provide each door with a relatively constant supply of potatoes. The operation of this machine is further described with reference to FIG. 6, but it should be noted that all the weighing machines 10a to 10d tip on to either one of the two conveyors 40 and 41.

Figure 5:
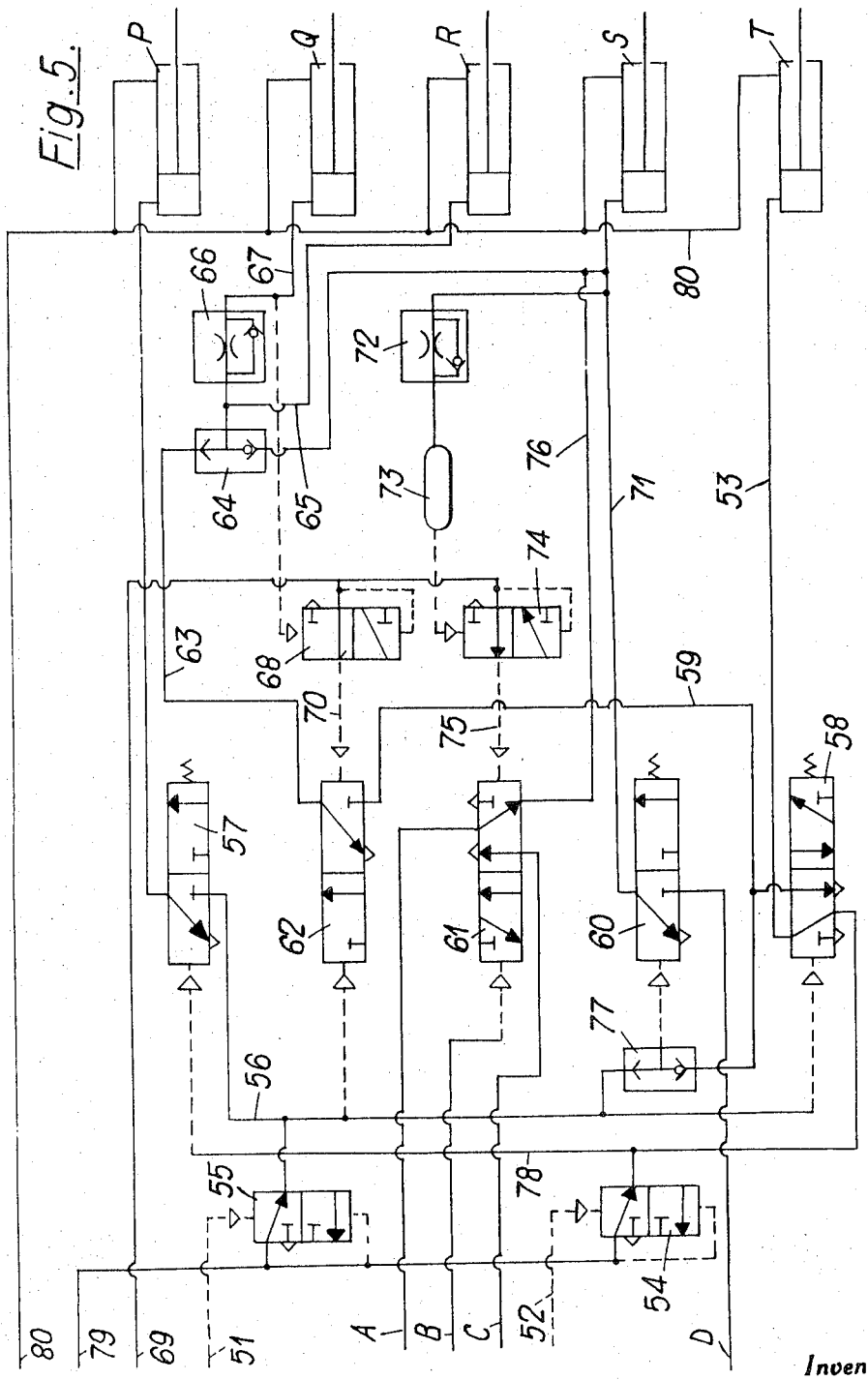
FIG. 5 is a fluidic circuit diagram for use in the control of the apparatus shown in FIGS. 1 to 4.
Figure 6:
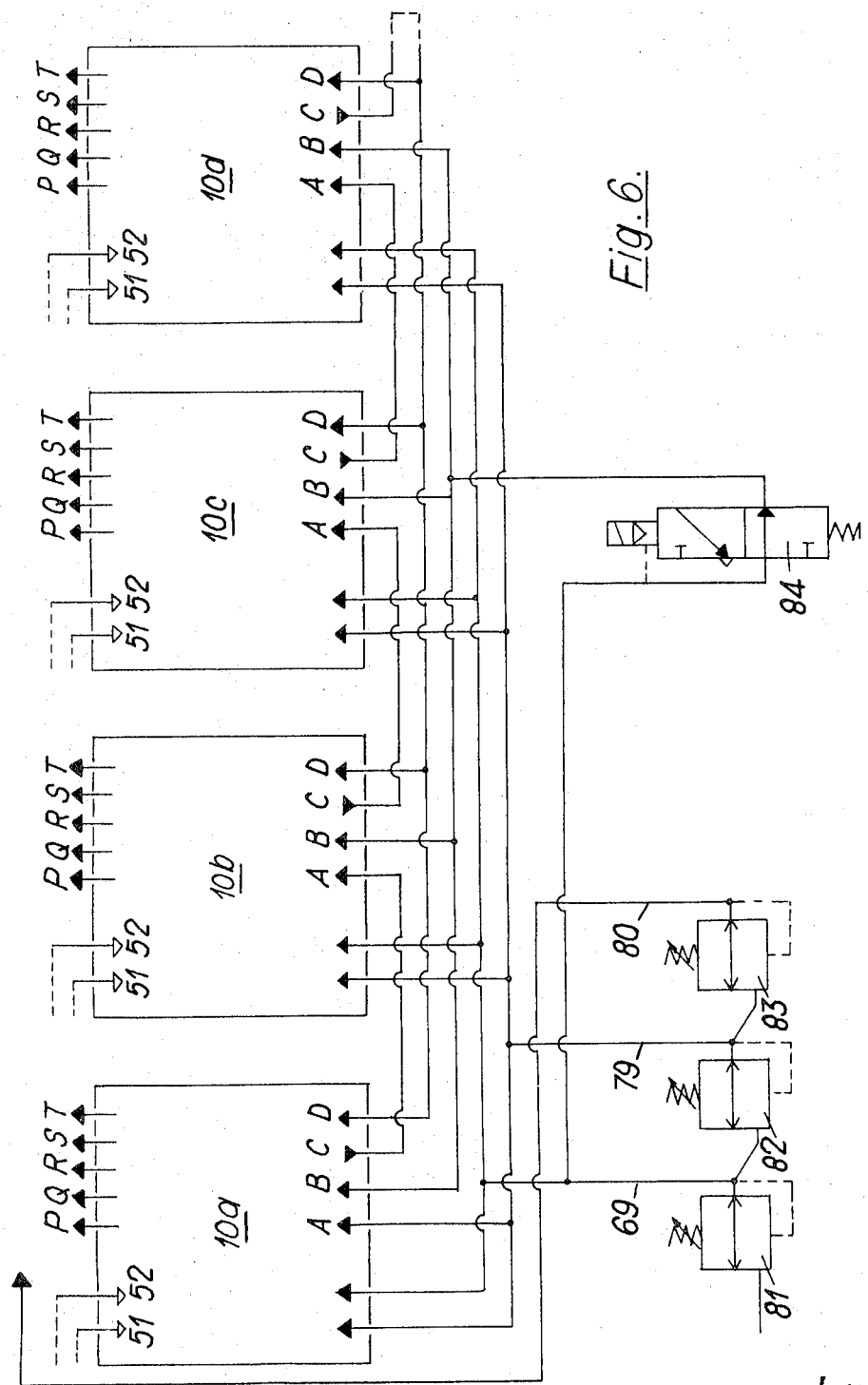
FIG. 6 is a fluidic circuit diagram for control of a four weighing machine arrangement as shown in FIG. 4; incorporating four of the circuits of FIG. 5.

Referring to FIGS. 5 and 6, these show fluidic circuit diagrams for operating the weighing machines described.

FIG. 5 shows a circuit diagram suitable for use with the machine shown in FIGS. 1 to 3. The cylinder P controls the flow of smaller potatoes to the pan 15 by opening and closing the door 9 of the conveyor 4. In the outstroke position of the piston, the door 9 is open. The cylinder Q (which is reference 37 in FIG. 2) causes the pan 15 to be emptied on to the conveyors 40 or 41 when in its outstroke position. The cylinder R locks the weighing apparatus in the fully loaded position when outstroked, and the cylinder S causes the contents of the pan 15 to be deflected by gate 42. When the cylinder is outstroked the gate takes up position P1 in FIG. 4 and when instroked the gate takes up position P2 in FIG. 4. The cylinder T controls the flow of larger potatoes from the conveyor 3 to the door 8 and permits potatoes to pass through the opening 6 when the cylinder is outstroke.

The valves 54 and 55 are constructed as air return three port poppet valves piloted by low pressure air jets. The valves 57 and 60 are three port spring return air operated valves which are normally open; valve 58 is a five port air operated spring return valve and valve 61 is a five port double pressure operated valve. Valve 62 is a three port double pressure operated valve, valves 68 and 74 are three port air return pressure sensitive valves which are normally closed, and valves 64 and 67 are shuttle valves, 66 and 72 are flow regulators, 81, 82 and 83 are pressure regulators, and 84 is a three port solenoid operated spring return valve which is normally open.

At the start of a cycle (no potatoes in the pan 15) the input lines 51 and 52 are energized resulting in line 53 being pressurized. Because of the pressure in line 53 the cylinder T holds open the door 8 controlling the initial feed of large potatoes. When the majority of the large potatoes has been deposited into the pan 15, the input line 52 is de-energized by the sensor 30 (as will be described) changing the air return valve 54 so as to exhaust line 78. This allows the air return cylinder T to close the door 8 and cut off the initial feed of large potatoes. By exhausting the line 78, the valve 57, being spring return, changes and allows the pressure in line 56 to pass air to cylinder T and hence open door 9 controlling the topping up flow of small potatoes to the pan 15 from the conveyor 4.

On reaching the full weight of potatoes from the topping up feed, the sensor 30 causes the input line 51 to de-energize and therefore line 56 to exhaust; it closes the door 9 controlling the topping up feed of potatoes via cylinder P.

If the resulting weight of the pan is above the preset allowable tolerance, the input line 52 and line 78 will be re-energized by the sensor 30. However, because there is no longer any pressure in line 56, air will pass from line 78 through valve 58 into line 59, through valves 62 in to line 63, through valve 64 into line 65, and operate cylinder R to lock the weighing receptacle in its fully loaded position. Air pressure in line 65 also operates via the flow regulator 66 the tipping cylinder Q; gate 42 is rotated by cylinder S into position P2 and the pan thus empties its potatoes onto conveyor 41 which returns them to the sorting apparatus. When the cylinder Q is fully operated pressure will increase in line 67, the valve 68 will change pressurizing line 70 which pilots the valve 62. The operation of valve 62 will exhaust lines 63, 65 and 67 and hence untip and reset the pan 15 to its normal position.

This action restores pressure in the input line 51 and 52 so that the next weighing can begin. If it is required to set the machine to tip out only a few potatoes onto the conveyor 41 it is merely necessary to alter the flow regulator 66 to the cylinder Q so that only partial tipping of the pan takes place. The pan is thus returned to its normal position with some potatoes still in and the weighing cycle begins again.

If the original weighing had been within the preset allowable tolerance, the input line 52 would not have been re-energized by the sensor 30. Because of this condition it will be seen that there will not be any pressure in lines 78, 56 and 59. This will allow a search signal in line D to pass through valve 60, delay devices 72, 73 and 74 and hence the pilot valve 61.

Air pressure in operating line A can therefore now pass through valve 61 via the line 76 into valve 64 and cylinder S. As before, pressure in valve 64 passes, via line 65, to cylinder R to lock the pan 15 in its fully loaded position; air also passes via the flow regulator 64 to cylinder Q which as before tips the contents of the pan 15, cylinder S has already moved the gate 42 to position P1 and the potatoes pass onto the conveyor 40 for bagging.

As can be seen, because the pressure to cylinder Q is controlled by flow regulator 64, the cylinder S will have preference over cylinder Q and complete its function before the potatoes are tipped. On this occasion the scale will only untip when the operating signal is removed. When this signal is removed, a signal B is then supplied to reset the valves 61.

In order to use the conveyors 3 and 4 to supply more than one weighing machine (which tip onto the two conveyors 40 and 41, for example as shown in FIG. 5), it is necessary to integrate the individual circuits so that more than one correct weight may not be tipped at the same time, but that an incorrect weight may be rejected as soon as it occurs. Such a circuit is shown in FIG. 6. The search line A for each of the circuits is left permanently open, and for the valve 61 to be operated, i.e. for a tipping action to be initiated, two conditions must be satisfied; firstly the pan must be in a correct weight position thereby closing inputs 51 and 52 and secondly no other scale must be tipping i.e. there must be an input signal at D. When a pan is tipping, the supply D to other circuits is cut off and it is thus impossible for more than one weighing pan to tip at any one time; this prevents two or more correct weights tipping onto the conveyor 40 simultaneously.

The pan is reset by a pulse signal at B; this pulse signal may be operated either from the bagging machine or by a simple timing circuit.

As it is only the removal of signal D that prevents correct tips occurring, it will be seen that a tip caused by pressure in line 59 can still happen, but this is an incorrect weight tip and does not interfere with any correct weight tips.

With a multi-loading machine, it is undesirable for two or more correct weights to be tipped onto the conveyor 40 simultaneously or substantially simultaneously, as either the loads will become confused on the conveyor or the bagging machine will be incapable of handling two correct weights arriving in quick succession.

This means that the tipping of a weighing pan containing a correct weight may be delayed whilst another pan is tipping. This problem may be substantially avoided either by providing two or more correct weight conveyors each having a separate bagging machine, or by dividing the conveyor 40 longitudinally down the center with a single vertical wall. A gate, similar to the rotary gate 42, is provided to direct correct weights of potatoes to one side or the other of the center wall. The gate may be controlled automatically to change from one side of the conveyor to the other immediately a correct weight has been deposited on the conveyor, or alternatively may be controlled by an independent timing device. In this case the gate would change over at fixed intervals e.g. every five seconds, and thus increase the possibility of an empty conveyor for a correct weight. A separate bagging machine is associated with each side of the conveyor.

Figure 7:
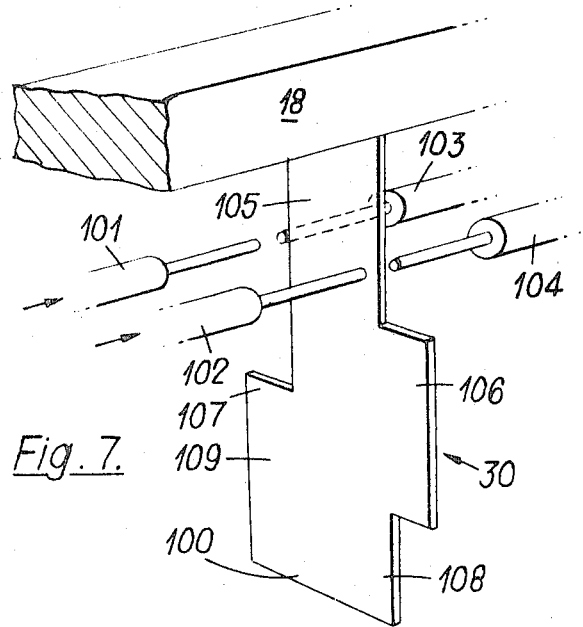
FIG. 7 is a perspective view on an enlarged scale of a sensor associated with the weighing device of FIG. 2; and, FIG. 8 is a perspective view on an enlarged scale of an alternative form of door used in the conveyor device shown in FIGS. 1 and 4.

FIG. 7 shows the construction and operation of the sensor 30. This comprises a shaped element 100 of sheet material, for example stiff plastic, which is secured to the bottom link of the scales 18 (FIG. 2). As the scales move in and out of balance, the element 100 moves up and down with the bottom link.

Two laminar flow generators 101 and 102 are mounted below the scales 18 and fixed with respect thereto, and low pressure air is fed into these generators in the direction of the arrows. The air is picked up by receivers 103 and 104 respectively.

These low pressure air flows from the receivers 103 and 104 form the inputs 51 and 52 of the fluidic circuit shown in FIG. 5, the air from receiver 103 being the input 51 and the air from the receiver 104 being the input 52.

The interruption and resumption of the air flows controls the operation of the circuit of FIG. 5 and therefore the operation of the apparatus. When there are no potatoes in the pan, the element 100 is at its lowest point with respect to the generators and its narrow portion 105 does not interrupt air flows from the generators. As aforesaid, in this condition the input lines 51 and 52 are energized by this airflow and large potatoes are allowed to fall into the pan 15. As the weight of the pan increases towards the predetermined total weight, the scales, and thus the element 100 move upwardly; the step portion 106 of the element 100 cuts off the air flow from generator 102 and thus de-energizes input 52. Flow from generator 101 is maintained at this stage.

The de-energizing of input 52 operates the piston which closes the door 8, thus stopping the flow of large potatoes. As aforesaid, the de-energizing of input 52 also operates door 9 which starts the flow of small topping-up potatoes. As the weight of the pan approaches the correct weight the element 100 continues to move upwardly and at the correct weight cuts the flow from generator 101 by the step 107. This de-energizes the line 51 and as a result the flow of small potatoes to the pan is cut off.

If the lines 51 and 52 remain de-energized the apparatus is in balance and the correct weight tipping cycle is activated. If however, the pan is in an overweight condition, the element 100 continues to rise and the portion cut away at 108 re-energizes the flow from generator 102; the reject tipping cycle is then activated. In this condition portion 109 of the element continues to cut off flow from the generator 101.

Instead of the flow generators 101 and 102 other means for sensing the weight may be employed, such as photocells or electrical contact switches.

Figure 8:
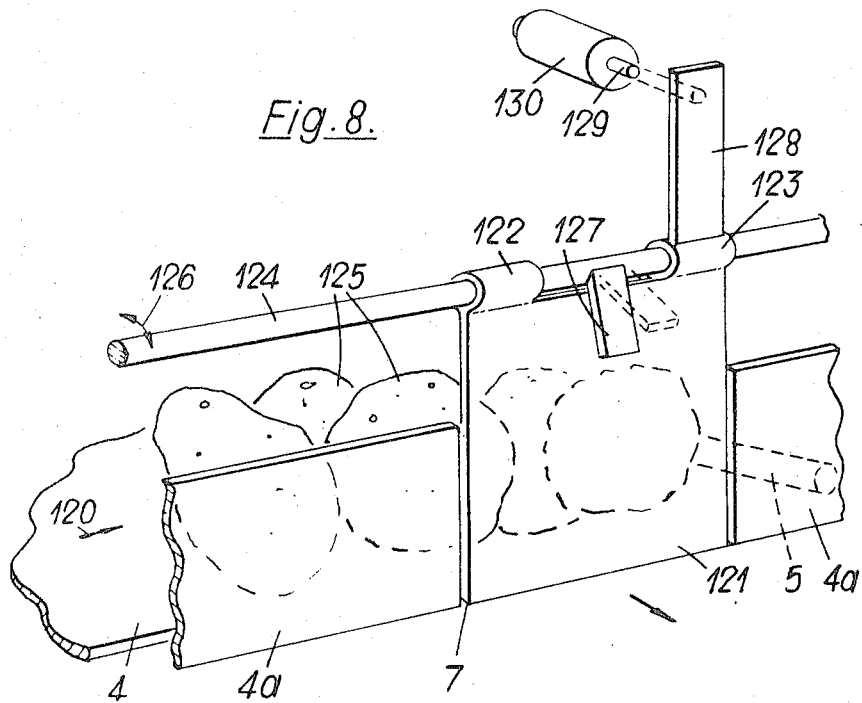

Referring now to FIG. 8, this shows an alternative construction of door to the sliding doors 6 and 9. In order to increase the possibility of a correct weight being obtained in the pan 15, it is advantageous to let only one potato through the openings 7 and 8 at a time. This is particularly so with the small potatoes used for topping up to the correct weight.

FIG. 8 shows the conveyor 4 moving in the direction of the arrow 120 and the side walls 4a and guide bar 5. The opening 7 in the walls 4a is closed by a swing door 121 which is suspended by loose bearings 122 and 123 which pivot on an operating arm 124.

The door is free to swing on the arm 124 and is normally pushed open by the potatoes 125 which crowd against the door due to the arm 5. The door may also be lightly spring loaded towards the open position by a tension spring (not shown).

The operating arm 124 oscillates rapidly in the direction shown by the arrows 126 and is provided with an abutment member 127 fixed to the arm; this member swings through an arc of approximately 90° to the position shown dotted in FIG. 8. At every oscillation this link forces the door 121 to close (as shown in FIG. 8) and the timing of the oscillations are selected to ensure that only one potato passes through the door when it is in an open position.

The door is locked closed by the action of a piston rod 129 of a piston and cylinder assembly 130 which acts on a link 128 fixed to the bearing 123. This piston rod 129 is activated to lock the gate closed when the potatoes in the pan reach the correct final weight. It will be appreciated that locking of the door does not interfere with the oscillation of the arm 124 and in a multiple weighing machine conveyor this arm can be common to a number of swinging doors 121.

The sliding doors 8 and 9 may be modified to provide a greater initial flow of potatoes through the openings 6 and 7. This is done by extending the door towards the sorting machine and directing this extension across the belt. This forms a scoop which collects potatoes when the door is closed and increase the flow through the openings when the door is open. The potatoes which are collected when the door is closed form a large initial batch for dumping into the weighing pan, and this helps to speed up the operation of the machine. This modification is most effective with the door 8 for the large potatoes.

A similar effect may be obtained by modifying the guide bars 5. This modification consists of providing the guide bars with a trailing edge extension which normally lies flat against the belt surface; in this position the extension does not interfere with the passage of the potatoes over the guide bar. When potatoes are required to pass through an opening in one of the side walls, the guide bar is rotated through approximately 90°; this raises the extension against the flow of potatoes and results in a substantially increased flow of potatoes through the opening.

I claim

1. Apparatus for delivering measured quantities of particulate commodities to a delivery point, comprising at least one weighing device, a particle receptacle associated with the weighing device, a conveying device operable to convey particles separately in two weight ranges from a loading point to said receptacle, sensing means associated with the weighing device, valve means for controlling the supply of particles of both weight ranges to the receptacle, said sensing means being operable at a predetermined preliminary weight in the receptacle to actuate said valve means to terminate delivery of particles in the higher weight range to the receptacle and at a predetermined final weight in the receptacle to actuate said valve means to terminate delivery of particles in the lower weight range to the receptacle, discharge means for discharging at least some particles in the receptacle when said final weight is reached, and directing means actuated by said sensing means for directing particles on discharge from the receptacle, whereby if, when delivery of particles is terminated, the weight of said particles in the receptacle is within a predetermined allowable tolerance over the final weight all the particles in the receptacle are discharged and directed to the delivery point, and if the weight of said particles in the receptacle is above the predetermined allowable tolerance over the final weight at least some of said particles in the receptacle are discharged and directed to a reject point.

2. Apparatus according to claim 1, wherein a plurality of weighing devices are provided, and particle receptacles are associated with each weighing device, each receptacle being supplied with particles by said conveying device.

3. Apparatus according to claim 1, wherein said conveying device comprises two conveyor belts arranged to run alongside each other, one of said conveyor belts being operable to convey particles in the higher weight range and the other of said conveyor belts being operable to convey particles in the lower weight range.

4. Apparatus according to claim 3, wherein each conveyor belt is provided with side walls extending alongside the belt, and openings are formed in the side walls for the passage of particles therethrough, each opening being provided with a guide bar extending across the belt immediately above the surface thereof and at an angle thereto, to guide particles on the belt through the openings formed in the side walls, each weighing device being supplied with particles through one opening formed in a side wall of each conveyor belt.

5. Apparatus according to claim 4, wherein said guide bars are formed with trailing edge extensions and the guide bars are adapted to be rotated through approximately 90° from a position in which the extensions lie substantially parallel to the surface of the conveyor belt to a position in which the extensions extend upwardly and substantially normal to the surface of the conveyor belt.

6. Apparatus according to claim 4, wherein said valve means comprise sliding doors operable by pneumatic piston and cylinder assemblies to open and close the said openings in the side walls of the conveyor to initiate and terminate the passage of particles therethrough.

7. Apparatus according to claim 6, wherein said sliding doors are provided with extensions to their vertical edges nearest to the supply of particles, said extensions being angled towards the center of the belt to collect particles on the belt when the doors are closed.

8. Apparatus according to claim 4, wherein the doors are flap doors pivotally suspended from an operating bar disposed above the belt, said bar being adapted to close said doors at intervals so that single particles only are allowed to pass one at a time through said openings.

9. Apparatus according to claim 1, wherein each weighing device includes a weighing receptacle supported on weighing scales, the scales being arranged to be substantially in balance at said predetermined final weight.

10. Apparatus according to claim 9, wherein said receptacle is tippable about said scales to discharge particles in the receptacle, locking means being provided to lock the scales in position during tipping of the receptacle.

11. Apparatus according to claim 4, wherein each weighing device is disposed beneath said conveyors and arranged so that particles passing through said openings fall into the receptacle of each said weighing device.

12. Apparatus according to claim 10, wherein a pneumatic cylinder and piston assembly is provided to tip said receptacle to discharge all the particles in the receptacle.

13. Apparatus according to claim 10, wherein a pneumatic cylinder and piston assembly is provided to partially tip said receptacle to discharge some of said particles therein.

14. Apparatus according to claim 1, wherein the reject point comprises a reject conveyor operable to transfer particles deposited thereon to a sorting machine for recirculation through the apparatus.

15. Apparatus according to claim 14, wherein particles on said conveying device which are not deposited in a receptacle of a weighing device are conveyed to said reject conveyor.

16. Apparatus according to claim 1, wherein said delivery point is a delivery conveyor.

17. Apparatus according to claim 16, wherein the delivery conveyor is provided with a central vertical wall disposed longitudinally of the conveyor to divide said conveyor in to two portions, and a gate operable to direct particles tipped on to said delivery conveyor on to one or other portion of the conveyor.

18. Apparatus according to claim 1, wherein said sensing means comprises two low pressure air flow generators each directing laminar air flows to a flow receiver, and a sensing element attached to the weighing apparatus and operable to move in a vertical plane passing between the flow generators and the receivers, said element being shaped so as to interrupt the flow of said generators at certain positions in the vertical plane and thereby provide a signal in an air operated circuit.

19. Apparatus according to claim 18, wherein the pneumatic cylinder and piston assemblies operate in response to signals received from the sensing means.

20. Apparatus according to claim 1, wherein the particles are potatoes.

21. Apparatus for accumulating batches of a particulate commodity and delivering those batches which are within a selected overweight range above a predetermined final weight to a delivery point, comprising in combination:

weighing means for accumulating successive batches of the commodity and including sensor means for producing an output proportional to the instantaneous weight of the commodity particles accumulated by said weighing means;

first conveyor means for continuously flowing a first stream of commodity particles of a heavy weight range along a first path extending into close proximity to and then beyond said weighing means;

second conveyor means for continuously flowing a second stream of commodity particles of a light weight range along a second path extending into close proximity to and then beyond said weighing means;

means for recycling commodity particles which flow past said weighing means and are discharged from said first and said second conveying means;

first control means actuated by said sensor means for diverting commodity particles of said first stream from said first path and discharging them to said weighing means until said sensor means produces an output indicative of the accumulation of commodity particles having a predetermined preliminary weight which is less than said final weight;

second control means actuated by said sensor means for diverting commodity particles of said second stream from said second path and discharging them to said weighing means at least after attainment of said preliminary weight and until said sensor means produces an output indicative of the accumulation of a final weight batch of commodity particles;

means actuated by said sensor means for discharging said batch from said weighing means for transfer to said delivery point when said sensor means produces an output, after cessation of diversion from both streams, indicative of a batch weight which is within said selected overweight range; and means actuated by said sensor means for discharging at least some of the particles of the batch from the weighing means to said means for recycling when said sensor means produces an output, after said cessation, indicative of a batch weight which is outside said selected overweight range.

22. Apparatus according to claim 21 including a plurality of weighing means disposed at spaced positions along and adjacent to said paths.

* * * * *